United States Patent [19]

Hansen

[11] 4,063,746

[45] Dec. 20, 1977

[54] SLEDGE

[75] Inventor: Odd Hansen, Fredrikstad, Norway

[73] Assignee: Plast & Form A/S, Fredrikstad, Norway

[21] Appl. No.: 692,224

[22] Filed: June 2, 1976

[30] Foreign Application Priority Data

June 5, 1975 Norway ................................ 751988

[51] Int. Cl.² ............................................ B62B 13/12
[52] U.S. Cl. ........................................ 280/16; 280/20; 280/21 R; D12/10
[58] Field of Search .................. 280/16, 18, 20, 21 R, 280/21 A, 22; D12/9, 10

[56] References Cited

U.S. PATENT DOCUMENTS

| 3,398,970 | 8/1968 | Horiuchi | 280/16 |
| 3,588,138 | 6/1971 | Cerny, Jr. | 280/16 |

FOREIGN PATENT DOCUMENTS

| 1,580,173 | 10/1970 | Germany | 280/16 |
| 1,912,593 | 9/1970 | Germany | 280/21 A |

Primary Examiner—Joseph F. Peters, Jr.
Assistant Examiner—Michael J. Forman
Attorney, Agent, or Firm—Wenderoth, Lind & Ponack

[57] ABSTRACT

A sledge comprises a seat portion supported via stays on a pair of main runners and a steering runner assembly rotatably mounted in a forward part of the seat portion. At a rear position of the sledge, the stays are connected pivotably about lateral axes to the seat portion and the pair of main runners respectively, and at a forward part of the sledge the main runners are connected pivotably about a longitudinal axis to the seat portion via a joined upwardly curved front portion of the main runners. The pivotable connections between the sledge seat portion and main runners provides for smooth stable sledging and steady steering.

6 Claims, 3 Drawing Figures

SLEDGE

BACKGROUND OF THE INVENTION

The present invention relates to a sledge comprising a seat portion supported via stays on a pair of main runners and a steering runner rotatably mounted in a forward part of the seat portion.

Owing to their rigid construction sledges of the above type tend to overturn when the main runners encounter irregularities in the sledging-run, and for the same reason the steering runner also tends to loose contact with the ground, resulting in an unsteady steering.

SUMMARY OF THE INVENTION

Thus, an object of the present invention is to provide a sledge construction which does not suffer from the above drawbacks, i.e., a more stable sledge providing steady steering.

According to the invention this is achieved by a sledge wherein, at a rear portion of the sledge, the stays are connected pivotably about lateral axes to the seat portion and the pair of main runners respectively and wherein, at a forward part of the sledge, the main runners are connected pivotably about a longitudinal axis to the seat portion via a joined upwardly curved front portion of the main runners.

Such a sledge construction permits supple or yielding relative movements between the seat portion and the main runners and between the main runners themselves, and provides the sledge with a stable three-point support in which the steering runner continually contacts the ground. By making the forward connection between the seat portion and main runners an easily detachable connection, the sledge may easily be folded up for storing or transport.

BRIEF DESCRIPTION OF THE DRAWINGS

An embodiment of the sledge according to the invention will be described in detail below with reference to the accompanying drawings, in which.

DETAILED DESCRIPTION OF THE INVENTION

Figure 1:
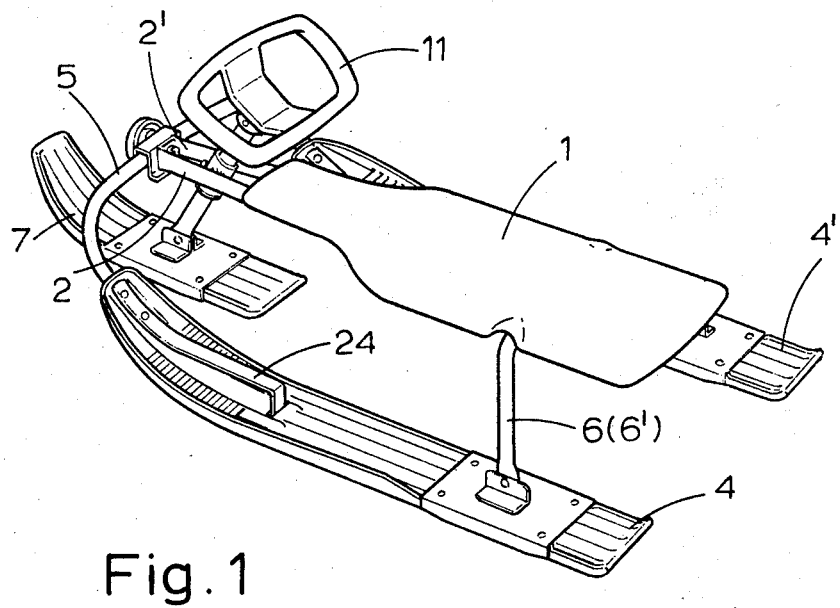
FIG. 1 is a perspective view of the sledge.

The sledge according to the embodiment of the invention illustrated in the drawings is substantially a steel tube construction consisting mainly of a seat portion, a pair of main or side runners and a forward central steering runner assembly.

Figure 3:
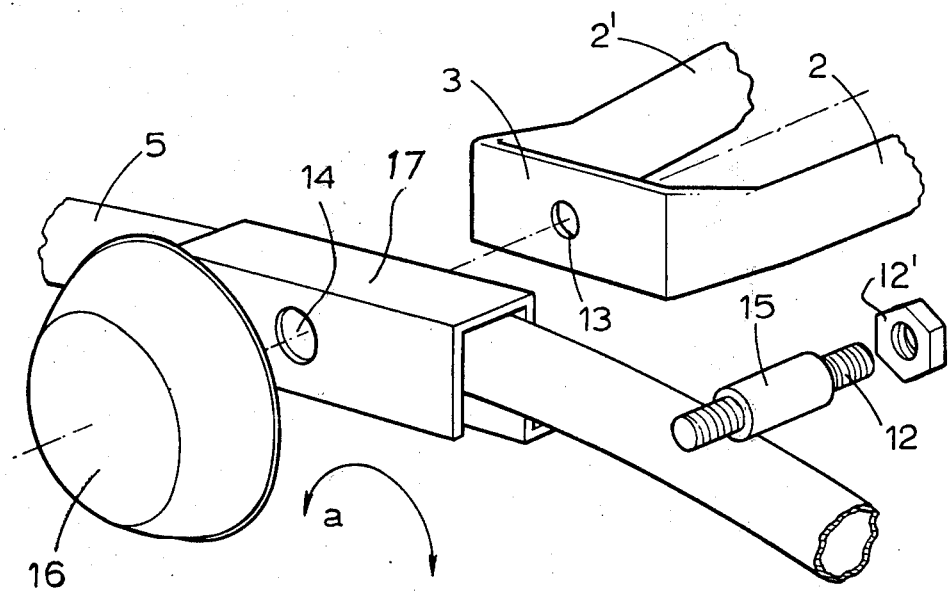
FIG. 3 is an exploded view showing details of the detachable connection between the seat portion and main runners.

The seat assembly or portion comprises a seat 1, e.g., of plastics, which is mounted on a pair of longitudinal steel tubes 2,2'. In their forward ends the seat steel tubes 2,2' are joined by a cross-piece 3, as best shown in FIG. 3.

The main runners comprise a pair of runners or skis 4,4', e.g. of plastics, which are attached to respective flattened legs of a U-shaped steel tube, the upward extending base of the U forming a joined or common front portion 5 of the main runners. Foot operated brake spurs 24 are mounted on the skis 4,4'. The forward end of the seat portion 1 bears on the upward extended front portion 5 of the main runners, and rearward of the sledge the seat portion is supported via a pair of stay bars 6,6' on each of the skis 4,4'.

The steering runner assembly comprises a relatively short plastics runner or ski 7, which through a metal fitting 8 is pivotably connected to an upwardly extending and rearwardly inclined steering column 9 which is rotatably mounted in a bearing sleeve 10 rigidly fixed, e.g. by welding, to the forward end of the seat portion between seat tubes 2,2'. A steering wheel 11 has depending therefrom an upper central sleeve 22 which fits over the top of column 9 and abuts the top of bearing sleeve 10.

A removable locking pin 23 extends through sleeve 22 and column 9, whereby rotation of steering wheel 11 causes rotation of column 9 within sleeve 10.

The above described features are substantially common for sledges of the introductorily mentioned type.

However, according to a new and important feature of the sledge according to the invention the connection between the seat portion and the main runners is articulated, in contrast to ordinary sledges where this connection is rigid.

Thus the forward mounting (A on FIG. 2) of the seat portion 1 on the main runner front portion 5 comprises a threaded pin or stud 12 extending longitudinally of the sledge through aligned apertures 13, 14, in the cross-piece 3 and front portion 5, respectively. Front portion 5 has fitted thereover a channel formed bearing member 17. An extended or greater diameter mid-portion or bushing 15 on the stud 12 extends through the aligned front portion aperture 14, while one threaded end portion of the stud extends through the smaller diameter aperture 13 in the seat cross-piece 3 and has threaded thereon a nut 12'. The connection is locked by means of a nut 16 threaded on to the opposite threaded end portion of the stud 12, the nut 16 having a practical configuration and diameter to allow easy on and off screwing without the need for an assisting tool. Thus, the main runner front portion 5 is free to pivot relative to the seat portion 1 about an axis extending in the longitudinal direction of the sledge as indicated by arrow a in FIG. 3. The channel formed bearing member 17 is provided with a protruding flange 17a against which will abut the lower edge of the seat portion cross-piece 3 to limit relative rotation therebetween.

Figure 2:
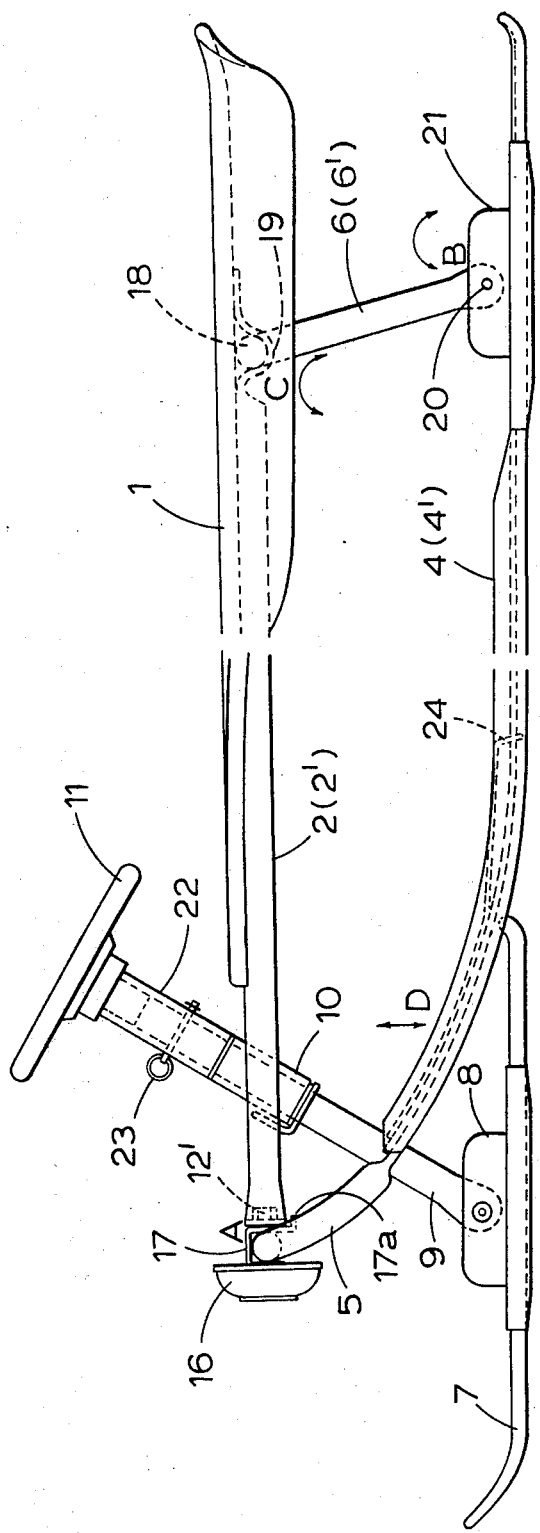
FIG. 2 is a side view of the sledge.

Furthermore, the stay bars 6,6', which connect the main runners to the seat portion at a rear part of the sledge, are pivotably mounted to the main runners and seat portion, respectively, about axes extending in lateral directions of the sledge, as indicated by arrows at B and C in FIG. 2.

In the embodiment illustrated in the drawings the stay bars 6,6' are formed integrally from a U-shaped steel tube with a lateral mid-portion 18 pivotably mounted in recesses or bows 19 formed in a flattened end portion of the seat portion steel tubes 2,2'. The stay bars 6,6' extend from their upper mounting at C in directions slightly inclined backwardly and outwardly toward the main runners, and at their lower ends the stay bars are pivotably connected by means of lateral pivots 20 as at B to metal fittings 21 on the skis 4,4', similar to the metal fitting 8 on the steering runner 7.

In use, if one of the main runners or skis 4,4' encounters an obstruction that runner will flexingly yield in a vertical direction as indicated by arrow D in FIG. 2, while the corresponding stay bar 6,6' simultaneously rotates in its upper and lower pivot mountings C, B in the seat portion and main runner, respectively. Once the obstruction has been passed, the runner, owing to the elasticity of the steel tube from which the main runners and stay bars are made, will flex back to its original position.

Thus, during sledging the sledge is supported in a stable three-point relationship in which a substantial part of the weight of the sledger always lies on the steering runner, thereby causing the latter to be maintained in contact with the ground and providing controlled steering of the sledge independent of irregularities or obstructions in the sledging run. As mentioned above, the pivotable connection A between the main runner front portion 5 and the seat portion cross-piece 3 may be detached by unthreading the nut 16 and pulling out the stud 12. This permits the seat portion 1 and stay bars 6,6' to be folded in between the main runners 4,4', thereby reducing the space occupied by the sledge during storage and transport. This feature of the invention is enhanced by the detachable connection between the steering column 9 and wheel 11, the upper end of the steering column, as shown in FIG. 2, being locked in a central sleeve 22 integral with the wheel by means of a rapid coupling, for example a through locking pin 23. By removing the locking pin 23 the wheel 11 and sleeve 22 can be lifted off the steering column 9, and the steering column with steering runner 7 can be withdrawn from the steering sleeve 10 in the seat portion 1.

The rear parts of the main runners 4,4' have relatively short, plane sliding surfaces preferably of substantially the same length as the steering ski 7, while the forward portions of the main runners 4,4' curve uniformly upwardly with a relatively large radius of curvature. This secures a better three-point support and allows for supple motion when the main runners encounter irregularities in the sledging run.

I claim:
1. A sledge comprising:
   a seat assembly;
   a pair of main runners;
   a substantially U-shaped member including a pair of legs joined by a base;
   each of said legs of said U-shaped member being joined to the forward end of a respective one of said main runners and extending therefrom in a forwardly and upwardly curved direction;
   said base of said U-shaped member being pivotally connected to said seat assembly about a single axis positioned centrally of said base and extending longitudinally of said main runners;
   a steering runner assembly including a steering runner attached to a steering column, said steering column being rotatably mounted on a forward portion of said seat assembly; and
   stay means for connecting a rear portion of said seat assembly to rear portions of said main runners, said stay means being pivoted to said seat portion and to each of said main runners about axes extending transversely of said main runners.

2. A sledge as claimed in claim 1, wherein said base is connected to said seat assembly by means of a threaded stud extending longitudinally of said main runners and a hand-operated nut threaded onto said stud.

3. A sledge as claimed in claim 1, wherein said base is connected to the forward-most portion of said seat assembly.

4. A sledge as claimed in claim 1, wherein the forward portion of each said main runner and the said leg joined thereto are upwardly curved over a substantial portion the combined length of said main runner and leg.

5. A sledge as claimed in claim 1, wherein said stay means comprises an inverted substantially U-shaped member including a pair of stay bars joined by an upper mid-portion, said mid-portion extending transversely of said seat assembly and being pivotally connected thereto, each said stay bar being pivotally connected at a lower end thereof to a respective said main runner about an axis extending transverse to said main runner.

6. A sledge as claimed in claim 1, wherein said steering runner assembly further comprises a bearing sleeve rigidly fixed to said seat assembly, said steering column rotatably extending through said bearing sleeve, a steering wheel having depending therefrom a central sleeve fitting over an upper portion of said steering column, and a pin removably coupling said central sleeve to said steering column, whereby turning of said steering wheel causes rotation of said steering column within said bearing sleeve and thereby turning of said steering runner.

* * * * *